United States Patent [19]

Fujita et al.

[11] 4,282,092

[45] Aug. 4, 1981

[54] PROCESS FOR PREPARING INORGANIC PARTICULATE ADSORBENT AND PROCESS FOR TREATING NUCLEAR REACTOR CORE-CIRCULATING WATER

[75] Inventors: Kazunori Fujita, Ibaraki; Shigeo Uno, Hitachi; Seizi Takeuchi, Hitachiota; Hisao Yamashita, Hitachi, all of Japan

[73] Assignee: Hitachi, Ltd., Tokyo, Japan

[21] Appl. No.: 80,468

[22] Filed: Oct. 1, 1979

[30] Foreign Application Priority Data

Sep. 29, 1978 [JP] Japan ................. 53-119255

[51] Int. Cl.³ .................. C02F 1/42; B01J 21/04; B01J 21/06
[52] U.S. Cl. .................. 210/682; 210/688; 252/463
[58] Field of Search ............. 252/463; 210/38 B, 38 C

[56] References Cited

U.S. PATENT DOCUMENTS

| 2,549,240 | 4/1951 | Robinson | 252/463 X |
| 4,039,478 | 8/1977 | Cull et al. | 252/463 X |
| 4,061,596 | 12/1977 | Matsushita et al. | 252/463 X |
| 4,156,646 | 5/1979 | Schulz | 210/38 C |

*Primary Examiner*—W. J. Shine
*Attorney, Agent, or Firm*—Craig and Antonelli

[57] ABSTRACT

An inorganic particulate adsorbent of a titania-alumina system for treating a superheated water containing radioactive materials such as cobalt ions, which is free from release of corrosive impruities, and which has a high adsorption capacity of radioactive materials and a high mechanical strength is prepared by hydrolyzing a titanium alkoxide and an aluminum alkoxide, thereby forming a hydrous titanium oxide and a hydrous aluminum oxide, respectively; precalcining the hydrous titanium oxide and aluminum oxide, mixing and molding the resulting titania and alumina into a particulate mixture thereof having a titania mole fraction of 0.2–0.9, and calcining the particulate mixture at 500°–700° C. This absorbent is effectively used in treating boiling water-type nuclear reactor core-circulating water to remove radioactive substances therefrom.

22 Claims, 5 Drawing Figures

PROCESS FOR PREPARING INORGANIC PARTICULATE ADSORBENT AND PROCESS FOR TREATING NUCLEAR REACTOR CORE-CIRCULATING WATER

This invention relates to a process for preparing an inorganic particulate adsorbent of a titania-alumina system for treating superheated water containing radioactive materials, and a process for treating core-circulating water in a boiling water-type nuclear reactor with an inorganic particulate adsorbent of a titania-alumina system to remove radioactive substances from the core-circulating water.

A reduction of radioactivity in a nuclear power plant based on a boiling water-type nuclear reactor is very important, because of a radioactive exposure to the bodies of workers at every regular inspection of the nuclear reactor. Especially, cobalt in nuclear reactor core-circulating water, which will be hereinafter referred to as core-circulating water, is radioactivated and the radioactive cobalt is accumulated in the core circulating water. Thus, it is necessary to remove the radioactive cobalt from the core-circulating water.

The radioactive cobalt is removed from the core-circulating water of boiling water type nuclear reactor in the following manner.

Figure 1:
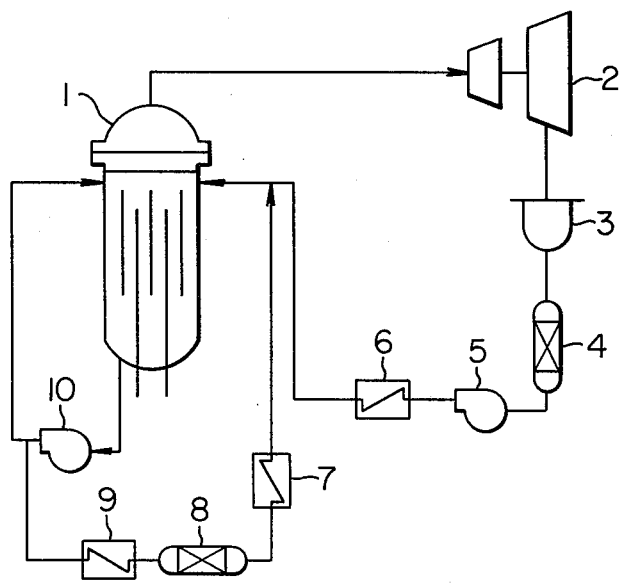
FIG. 1 is a schematic flow diagram of a nuclear power plant based on a boiling water-type nuclear reactor.

In FIG. 1, a nuclear power plant based on a boiling water-type nuclear reactor is schematically shown. A superheated, high pressure steam (288° C., 75 kg/cm² gage) is withdrawn from the top of a boiling water-type nuclear reactor 1, and led to a turbine-generator 2, where the energy possessed by the steam is converted to an electric energy, and then the steam exhausted from the turbine-generator 2 is led to a condenser 3. The resulting condensate is then led to demineralizer 4, filled with an ion exchange resin, where contaminants including radioactive materials are removed by adsorption. The resulting contaminant-free condensate is pumped by a condensate pump 5, heated through a heat exchanger (heater) 6, and returned to the nuclear reactor 1.

On the other hand, nuclear reactor core-circulating water at 288° C. (i.e. the core water temperature) is withdrawn from the lower part of the nuclear reactor 1 and circulated to the upper part of the nuclear reactor 1 by a circulating pump 10, and a portion of the core-circulating water is withdrawn on the way in the circulating line, cooled to 50°–60° C. through a heat exchanger (cooler) 9, and led to a demineralizer 8 filled usually with an organic ion exchange resin, where the radioactive cobalt ions accumulated in the core-circulating water are removed from the core-circulating water by ion exchange. The radioactive cobalt ion-free core-circulating water is led through a heat exchanger (heater) 7, joined with the returning condensate from the heat exchanger 6, and returned to the nuclear reactor 1.

However, in the conventional demineralizer for treating the core-circulating water as shown by the demineralizer 8 in FIG. 1, the flow rate of the core-circulating water to be treated in the demineralizer 8 cannot be increased on account of the heat loss of the core-circulating water. Therefore, it is difficult to increase the efficiency of the removal of radioactive substances in the nuclear reactor core water. It has been desired to treat the core-circulating water at a core-circulating water temperature just as withdrawn from the nuclear reactor without any cooling.

The adsorbents capable of removing transition metals such as cobalt from hot water, especially superheated water above 100° C. by adsorption have not been readily available, though many studies have been made so far as to various inorganic adsorbents (ion exchangers) including hydrous oxides of metal, as described in detail for example, in M. Abe: Bunseki Kagaku (Japan Analyst) 23 1254–1285 (1975) as general surveys. Those adsorbents as disclosed therein have a resistances to radioactivity and heat, and thus have been regarded as promising in various fields of application, but have been very little utilized in the industry.

In the hydrous oxides of metal as the inorganic ion exchanger, hydroxyl groups on the surfaces of the oxides have the property of ion-exchanging groups as a functional group, and thus can be used as the adsorbents. However, they have no high mechanical strength by themselves, and when they are immersed in superheated water above 100° C., the hydrous oxides of metals are dissolved therein, and deposited on some cooler surface in the circulation line. Thus, these hydrous oxides have not been used in a form of a fixed bed type for the core-circulating water.

In this connection, the present inventors found as a result of further study that titania can selectively adsorb the cobalt ions in hot water and proposed an adsorbent of titania supported on porous alumina having a high mechanical strength (U.S. Patent Application Ser. No. 882,334, now U.S. Pat. No. 4,178,270), where an adsorbent being insoluble in hot water and having a good mechanical strength and a good cobalt adsorption capacity can be prepared. As to the cobalt adsorption capacity of an adsorbent applicable to purification of core-circulating water, 40–100 $\mu$eq/g of the adsorbent (by calculation) is regarded as being satisfactory in the case of the application to 460,000–1,100,000 kw power plants.

On the other hand, it is desirable for the adsorbent for purifying the core-circulating water that the adsorbent contains no corrosive impurities in addition to said properties. For example, even if the corrosive impurities such as chloride ions and sulfate ions are contained even in a very small amount in the adsorbent, such an amount will be not negligible because of a large amount of the adsorbent used for said purpose, and will cause corrosion of piping and reactor core materials.

The present invention have made a further study under these circumstances and on the basis of this knowledge, and have established the present invention. That is, the present inventors have found the following facts as a result of extensive tests on selection of raw materials for titania and alumina, a mixing ratio of titania and alumina, and precalcining and calcining temperatures.

An adsorbent prepared from titanium tetrachloride generally used as a raw material for hydrous titanium oxide and aluminum sulfate generally used as a raw material for hydrous aluminum oxide contains residual chloride ions and sulfate ions as impurities not removed by washing, and the remaining chloride ions and sulfate ions are dissolved into superheated water at the adsorption operation, and, sometimes gives an adverse effect upon the adsorption capacity. In the present invention, a titanium alkoxide and an aluminum alkoxide are used as the raw materials in place of said titanium tetrachloride and aluminum sulfate. Thus, the resulting adsorbent contains no such remaining impurities, and can provides an excellent adsorption capacity.

Figure 2:
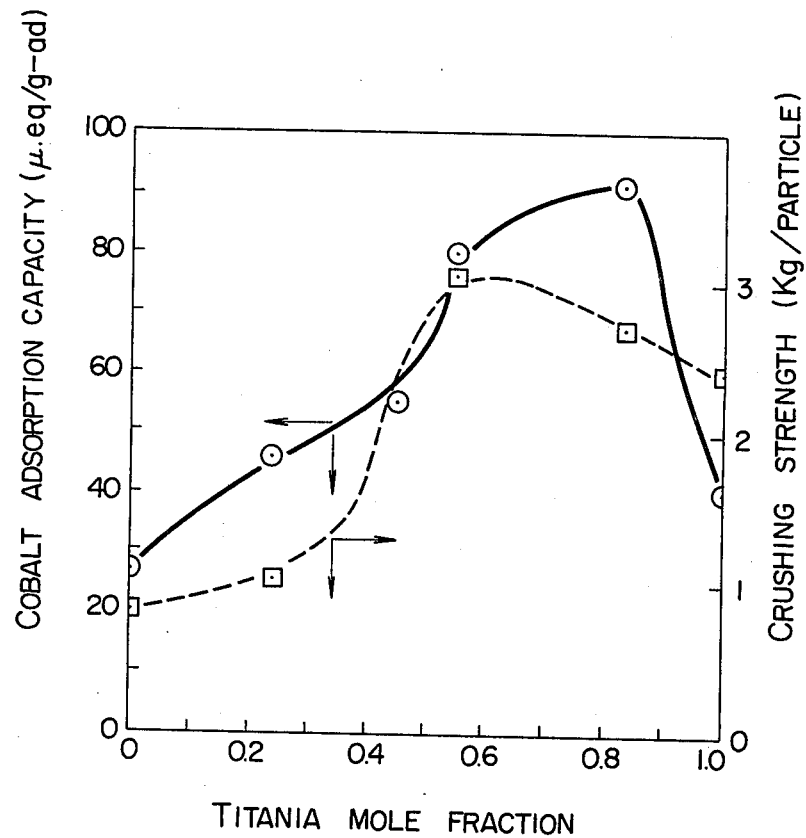
FIG. 2 is a diagram showing the relations between the titania mole fraction of a particulate adsorbent of titania-alumina system, and the cobalt adsorption capacity and the crushing strength of the particulate adsorbent.

When the present inventors prepared particulate adsorbents of a titania and alumina system by mixing titania and alumina while changing the titania mole fraction and calcining the resulting mixtures at 500° C., and used the resulting adsorbents to determine the cobalt adsorption capacity of the adsorbents for superheated water containing cobalt ions at about 280° C. and the crushing strength of the adsorbents, the results obtained are shown in the diagram of FIG. 2. It is obvious from FIG. 2 that a good adsorption capacity of 40 $\mu$eq/g of adsorbent or higher and a good crushing strength of 1 kg/particle of adsorbent or higher can be obtained at a titania mole fraction of 0.2–0.9, preferably at 0.4–0.9.

Figure 3:
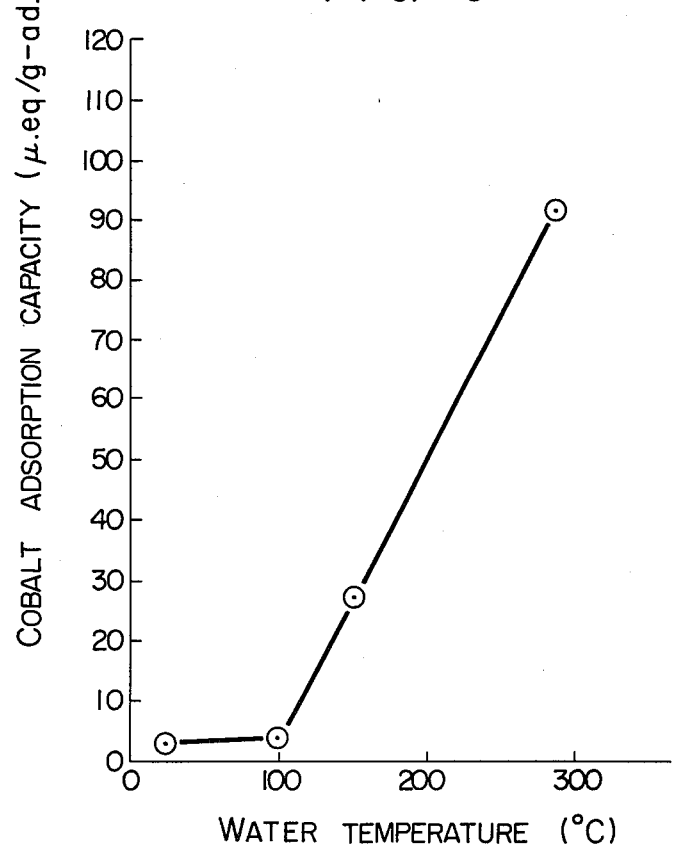
FIG. 3 is a diagram showing a relation between a water temperature and a cobalt adsorption capacity of a particulate adsorbent of a titania-alumina system having a titania mole fraction of 0.55.

Among the adsorbents prepared in the same manner as above, the present inventors also measured the cobalt adsorption capacity of an adsorbent having a titania mole fraction of 0.55 while changing the temperature of superheated water containing cobalt ions, and the results obtained are shown in FIG. 3. It is obvious from FIG. 3 that the adsorbent of the present invention has a considerably increasing cobalt adsorption capacity with increasing core water temperature above 100° C., i.e. from 100° to 300° C.

Figure 4:
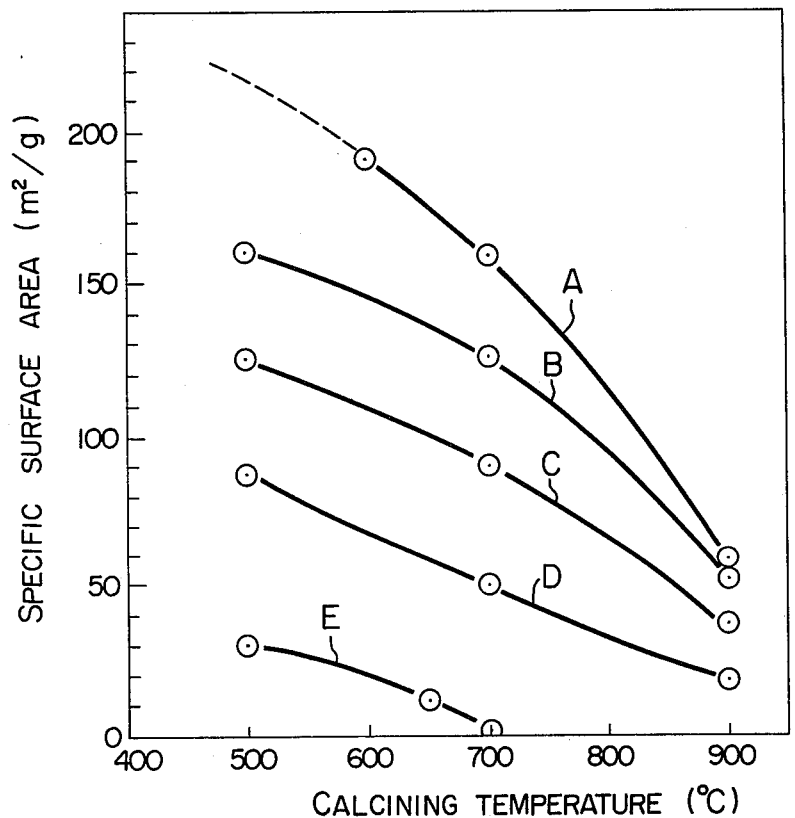
FIG. 4 is a diagram showing the relations between a calcining temperature of a titania and alumina particulate mixture, and a specific surface area of the resulting particulate adsorbent.
Figure 5:
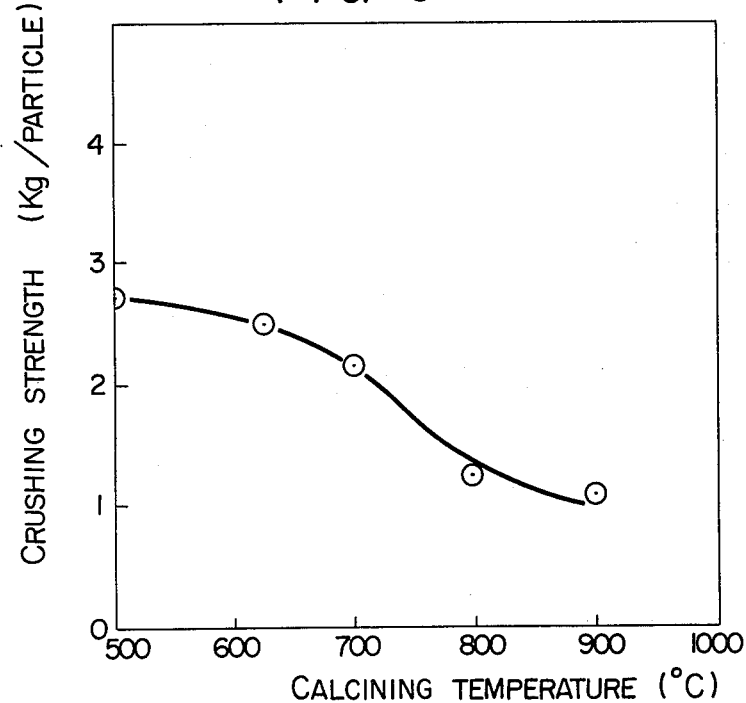
FIG. 5 is a diagram showing the relations between a calcining temperature of a titania and alumina particulate mixture and a crushing strength of the resulting particulate adsorbent.

The present inventors have further measured the specific surface areas of adsorbents of a titania-alumina system having various titania mole fractions, prepared by calcination at various temperatures of 500°–900° C., and also have measured the crushing strength of adsorbents of the titania-alumina system having a titania mole fraction of 0.83, calcined at various temperatures of 500°–900° C. The results are shown in FIGS. 4 and 5. In the present invention, a precalcination is carried out at 450°–500° C., as will be described later, the calcination below 500° C. was not particularly carried out.

In FIG. 4, curves A, B, C, D and E show the tests with the adsorbents having titania mole fractions, 0, 0.24, 0.55, 0.83, and 1 correspondingly. As is evident from FIGS. 4 and 5, the specific surface area and crushing strength are decreased with increasing calcining temperature, and both are considerably lowered at 900° C., whereas good results can be obtained at a temperature range of 500° to 700° C.

In the present invention, the titania mole fraction is adjusted with alumina to prevent sintering and to maintain the activity (adsorption capacity), because the specific surface area of the resulting adsorbent is decreased. Owing to the sintering that takes place at a calcining temperature above 500°–600° C. the activity (adsorption capacity) is lost, as shown in FIGS. 4 and 5. The mechanical strength and the specific surface area of the adsorbent are harmonized by conducting the calcination at 500°–700° C.

Why proper selection of the titania mole fraction and calcining temperature can give an excellent adsorption capacity to the present adsorbent seems to be on the following grounds. Titania formed by calcination is rehydrated by superheated water to form hydroxyl groups on its surface and can adsorb cobalt ions owing to the ion exchangeability of the hydroxyl groups. Alumina contained in the admixture can increase the specific surface area over that of titania only, and thus this increase further increases the adsorption capacity.

The present invention has been established on the basis of the foregoing findings, where titania and alumina prepared from specific corresponding raw materials are used in preparing the present particulate adsorbent while a titania mole fraction in a titania and alumina mixture is specified, and a specific range of calcining temperature is employed to give a good mechanical strength and a preferable specific surface area to the resulting particulate adsorbent.

Furthermore, when the present particulate adsorbent is filled in the demineralizer 8 in the bypassed core-circulating water line from the boiling water type nuclear reactor in place of the conventional adsorbent, a cooling duty of the heat exchanger (cooler) 9 and the heating duty of the heat exchanger (heater) 7 can be considerably reduced or both heat exchangers 9 and 7 can be omitted, and the core-circulating water at 288° C. can be directly passed through the demineralizer 8 filled with the present particulate adsorbent without any cooling.

Furthermore, the present particulate adsorbent is free from any corrosive impurity such as chloride ions and sulfate ions, and thus no corrosion appears in piping material and core materials, even when used in such manner as above.

The present invention provides a process for preparing an inorganic particulate adsorbent of a titania-alumina system for treating a superheated water containing radioactive materials which comprises:

(1) hydrolyzing a titanium alkoxide and an aluminium alkoxide at the ordinary temperature, thereby forming a hydrous titanium oxide and a hydrous aluminum oxide, respectively, (2) precalcining the hydrous titania and the hydrous alumina at 450°–500° C., thereby forming titania and alumina, (3) mixing and molding the resulting titania and alumina at a titania mole fraction of 0.2–0.9, thereby preparing particulate mixture of titania and alumina, and (4) calcining the resulting particulate mixture at 500°–700° C. in an oxidative atmosphere.

Furthermore, the present invention provides a process for treating boiling water-type nuclear reactor core-circulating water which comprises contacting nuclear reactor core circulating water with an inorganic particulate adsorbent of a titania and alumina system free from corrosive impurities and having a titania mole fraction of 0.2–0.9 at a temperature of at least 100° C., thereby removing radioactive substances such as cobalt ions from the nuclear reactor core-circulating water.

In preparing the particulate adsorbent of the titania-alumina system according to the present invention, the titanium alkoxide used as a raw material for titania includes, for example, titanium methoxide, titanium ethoxide, titanium butoxide, titanium isopropoxide, etc., and titanium isopropoxide is particularly preferable.

The aluminum alkoxide used as a raw material for alumina includes, for example, aluminum methoxide, aluminum ethoxide, aluminum butoxide, aluminum isopropoxide, etc., and aluminum isopropoxide is particularly preferable.

These titanium alkoxide and aluminum alkoxide are easily hydrolyzed at the ordinary temperature in the presence of water, thereby forming the respective hydrous oxides. At the hydrolysis, alcohol is also formed, but can be removed by washing the resulting hydrous oxides with water and heating the hydrous oxides in an oxidative atmosphere, for example, in the air, to 300°-400° C., whereby a very small amount of remaining alcohol is vaporized or burned.

Then, the hydrous oxides are milled to 140 mesh or higher (particle size: 70 μm or less) in a ball mill, individually, and precalcined at 450°-500° C. in an oxidative atmosphere, for example, in the air, for about 5 hours. The precalcination is a necessary treatment for converting the hydrous oxides completely to their oxides, because after said heating at 300°-400° C., some hydroxyl groups (hydrous component) still remain on the oxides, especially titania. If kneading is carried out in that state, extrusion and molding in particulate mixture are hard to carry out, because no densification occurs. When the precalication is carried out at too high a temperature, the specific surface area is undesirably decreased, as described before, and thus an appropriate precalcination temperature is 450°-500° C.

Then, these two oxides, that is, titania and alumina, are mixed at a titania mole fraction of 0.2-0.9, preferably 0.4-0.9, and molded into particulate mixture, for example, by kneading, extrusion and cutting. At the molding 10-50% by weight of water is added to the mixture on the basis of the oxides. The kneading time necessary for densifying the mixture is 4-6 hours.

Then, the resulting particulate mixture is calcined at 500°-700° C. in an oxidative atmosphere, for example, in the air, whereby the present particulate adsorbent can be obtained. The present particulate adsorbent is preferably in a spherical form and has a particle size of 0.8-1.6 mm in view of a pressure drop when filled in the demineralizer.

The present invention and its effects will be described in detail below, referring to Examples, but the present invention is not limited thereto.

EXAMPLE 1

(Influence of titania mole fraction)

Titanium isopropoxide and aluminum isopropoxide were hydrolyzed at the ordinary temperature by adding water thereto, and the respective hydrous oxides were obtained thereby. The individual hydrous oxides were washed with water and heated to 300°-400° C. in the air to oxidize them, and then pulverized to fine powder of 140 mesh or more (particle size: 70 μm or less), and precalcined at 500° C. for 5 hours. The resulting titania and alumina were mixed together at titania mole fractions of 0.24, 0.55, 0.83 and 1.0 (only titania). The individual mixtures were placed in individual kneaders, and admixed with 28-35% by weight of water on the basis of individual mixtures, and then the individual mixtures were kneaded for 4 to 6 hours to density the powder. The resulting individual mixtures in a paste form were extruded through a nozzle having a diameter of 1.5 mm, and molded into spheres. The spheres of the individual mixtures were calcined at 500° C. for 6 hours, and used as particulate adsorbents in cobalt adsorption test.

The cobalt adsorption test of superheated water was carried out by means of a modeled test apparatus of the circulating line as shown in FIG. 1 according to a column pass-through method. That is, water having a cobalt concentration of 3 ppm was passed through a titanium metal column having an inner diameter of 10 mm, filled with 1 g of one of the particulate adsorbents as prepared above at a flow rate of 8.6 ml/minute for 7 hours after having been passed through a titanium metal preheater, while keeping the column temperature at 280° C. and the column pressure at 75 kg/cm² gage. After the end of adsorption test, a nitrogen gas was passed through the column at the same temperature to remove the water retained therein. Then, the adsorbent was taken out of the column, and melted in potassium pyrosulfate, and dissolved in dilute hydrochloric acid. The cobalt content of the solution was measured by atomic absorption analysis.

Specific surface areas of the individual adsorbents were measured according to BET method by nitrogen adsorption at liquid nitrogen temperature, and mechanical strength was determined as an average of crushing strengths of ten cylinders (1.5 mm in diameter and 1.5 mm in height) by means of a hardness tester.

The results are summarized in the following Table 1.

TABLE 1

| Titania mole fraction | Cobalt adsorption capacity (μeq/g) | Specific surface area (m²/g) | Crushing strength (Kg/particle) |
|---|---|---|---|
| 0.24 | 46 | 169 | 1.0 |
| 0.55 | 80 | 124 | 3.2 |
| 0.83 | 92 | 87 | 2.7 |
| 1.0 | 40 | 31 | 2.4 |

As is evident from Table 1, the cobalt adsorption capacity is low when the titanium mole fraction is low, though the specific surface area of the adsorbent is large. This seems to be due to the small content of the necessary titania for adsorption. On the other hand, when the titania mole fraction is 1.0, that is, when the adsorbent consisted only of titania, the specific surface area of the adsorbent is low, and thus the cobalt adsorption is also low. It is seen that the adsorption capacity of the adsorbent can be considerably increased by adding alumina to titania, and also the crushing strength can be increased thereby.

EXAMPLE 2

(Influence of calcining temperature)

Particulate adsorbents were prepared in the same manner as in Example 1 at a fixed titania mole fraction of 0.83 and calining temperatures of 500° C., 700° C. and 900° C., and subjected to cobalt adsorption test. Cobalt adsorption capacity and specific surface area and crushing strength of the particulate adsorbents were determined in the same manner as in Example 1. The results are given in the following Table 2.

TABLE 2

| Calcining temperature (°C.) | Cobalt adsorption capacity (μeq/g) | Specific surface area (m²/g) | Crushing strength (Kg/particle) |
|---|---|---|---|
| 500 | 92 | 87 | 2.7 |
| 700 | 75 | 50 | 2.3 |
| 900 | 35 | 19 | 1.2 |

As is evident from Table 2, the specific surface area is decreased with increasing calcining temperature, and the cobalt adsorption capacity is also decreased therewith, and is considerably large at 900° C. At 900° C., the crushing strength is decreased to almost half of that at 700° C. It seems that an appropriate calcining temperature is in a range of 500°–700° C.

EXAMPLE 3

(Influence of raw material species)

Titanium tetrachloride and aluminum sulfate were used as raw materials for hydrous titania and hydrous alumina, respectively, and were hydrolyzed with caustic soda as an alkali to obtain the respective hydrous oxides. From the resulting oxides were prepared a particulate adsorbent at a titania mole fraction of 0.55, and at a calcining temperature of 500° C. in the same manner as in Example 1, and the particulate adsorbent was subjected to cabalt adsorption test. The cobalt adsorption capacity, and specific surface area and crushing strength of the adsorbent were determined in the same manner as in Example 1. The results are given in Table 3. For comparison, test results of the particulate adsorbent prepared from the alkoxides under the same conditions as above, that is, as given in Example 1 are also shown together in Table 3.

TABLE 3

| Raw materials | | Cobalt adsorption capacity (μeq/g) | Specific surface area (m²/g) | Crushing strength (Kg/particle) |
|---|---|---|---|---|
| Titania | Alumina | | | |
| Titanium isopropoxide | Aluminum isopropoxide | 80 | 124 | 3.2 |
| Titanium tetrachloride | Aluminum sulfate | 18 | 81 | 3.4 |

As is evident from Table 3, the cobalt adsorption capacity of the adsorbent prepared from titanium tetrachloride and aluminum sulfate is much lower than that of the adsorbent prepared from alkoxides as raw materials according to the present invention. In the former case, pH of the effluent water from the adsorbent column had a value of 3.1–3.4, which was lower than pH 4.1 at the inlet. This means that the chloride ions and sulfate ions not thoroughly washed away were retained in the adsorbent, and were dissolved in the superheated water at 280° C., whereby the pH at the surface of the adsorbent was considerably lowered. That is, it seems that the cobalt adsorption capacity was considerably influenced by the remaining impurities. In the case of the present invention, such impurities are not involved, and a better result can be obtained.

As described above, the radioactive transition metals such as radioactive cobalt can be efficiently removed from superheated water by the particulate adsorbent of the present invention, and also the present particulate adsorbent has a high mechanical strength, a high cobalt adsorption capacity and is free from corrosive impurities such as chloride ions and sulfate ions.

What is claimed is:

1. A process for preparing an inorganic particulate adsorbent of a titania-alumina system for treating superheated water containing radioactive materials, which comprises:
    (1) hydrolyzing a titanium alkoxide and an aluminium alkoxide, thereby forming a hydrous titanium oxide and a hydrous aluminum oxide, respectively,
    (2) precalcining the hydrous titanium oxide and the hydrous aluminum oxide, thereby forming titania and alumina,
    (3) mixing and molding the resulting titania and alumina, thereby preparing a particulate mixture of titania and alumina, and
    (4) calcining the resulting particulate mixture in an oxidative atmospheres.

2. A process according to claim 1, wherein the titanium alkoxide is selected from the group consisting of titanium methoxide, titanium ethoxide, titanium butoxide, and titanium isopropoxide, and the aluminum alkoxide is selected from the group consisting of aluminum methoxide, aluminum ethoxide, aluminum butoxide and aluminum isopropoxide.

3. A process according to claim 2, wherein the titanium alkoxide is titanium isopropoxide, and the aluminum alkoxide is aluminum isopropoxide.

4. A process according to claim 1, wherein the hydrolysis of the titanium alkoxide and the aluminum alkoxide is carried out at the ordinary temperature, respectively.

5. A process according to claim 1, wherein the hydrous titanium oxide and the hydrous aluminum oxide resulting from the hydrolysis are washed with water and heated in an oxidative atmosphere at 300°–400° C.

6. A process according to claim 1, wherein the precalcination is carried out at 450°–500° C. in an oxidative atmosphere.

7. A process according to claim 1, wherein the titania and the alumina are mixed at a titania mole fraction of 0.2–0.9.

8. A process according to claim 7, wherein the titania and the alumina are mixed at a titania mole fraction of 0.4–0.9.

9. A process according to claim 8, wherein the titania and the alumina are mixed at a titania mole fraction of 0.55.

10. A process according to claim 1, wherein the titania and the alumina are mixed and molded in the presence of water.

11. A process according to claim 10, wherein the amount of water is 10–50% by weight on the basis of total oxides.

12. A process according to claim 1, wherein the resulting particulate mixture are heated at 500°–700° C. in an oxidative atmosphere.

13. A process for treating boiling water-type nuclear reactor core-circulating water, which comprises contacting nuclear reactor core-circulating water with an inorganic particulate adsorbent of titania and alumina system free from corrosive impurities at a temperature of at least 100° C., thereby removing radioactive substances from the nuclear reactor core-circulating water.

14. A process according to claim 13, wherein the particulate adsorbent is in the form of spherical particles having a size of 0.8–1.6 mm.

15. A process according to claim 13, wherein the particulate adsorbent contains titania at a mole fraction of 0.2-0.9.

16. A process according to claim 14, wherein the particulate adsorbent contains titania at a mole fraction of 0.4-0.9.

17. A process according to claim 16, wherein the particulate adsorbent contains titania at a mole fraction of 0.55.

18. A process according to claim 13, wherein the corrosive impurities are chloride ions and sulfate ions.

19. A process according to claim 13, wherein the radioactive substances are radioactive cobalt ions.

20. A process according to claim 13, wherein the nuclear reactor core-circulating water at 100°-300° C. is contacted with the particulate adsorbent.

21. A process according to claim 13, wherein the nuclear reactor core-circulating water at core water temperature is contacted with the particulate adsorbent.

22. A process according to claim 13, wherein the particulate adsorbent having a crushing strength of at least 1 kg/particle and a cobalt adsorption capacity of at least 40 $\mu$eq/g of adsorbent is used.

* * * * *